(12) United States Patent
Grochowski et al.

(10) Patent No.: US 8,226,514 B2
(45) Date of Patent: Jul. 24, 2012

(54) MULTI-SPEED TRANSMISSION WITH AXIS TRANSFER

(75) Inventors: Edwin T. Grochowski, Howell, MI (US); Scott H. Wittkopp, Ypsilanti, MI (US); James B. Borgerson, Clarkston, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 403 days.

(21) Appl. No.: 12/464,152

(22) Filed: May 12, 2009

(65) Prior Publication Data

US 2010/0210388 A1 Aug. 19, 2010

Related U.S. Application Data

(60) Provisional application No. 61/152,854, filed on Feb. 16, 2009.

(51) Int. Cl.
 *F16H 3/72* (2006.01)
 *F16H 37/08* (2006.01)
(52) U.S. Cl. .............................. 475/5; 475/330; 475/275
(58) Field of Classification Search .............. 475/5, 275, 475/279, 302, 317, 330, 207; 180/65.21, 180/65.225, 65.235, 65.24
See application file for complete search history.

(56) References Cited

U.S. PATENT DOCUMENTS

| | | | | |
|---|---|---|---|---|
| 5,231,861 A * | 8/1993 | Tokumura et al. | ............... | 72/340 |
| 5,261,861 A * | 11/1993 | Lemieux | ........................ | 475/275 |
| 5,643,130 A * | 7/1997 | Park | ............................... | 475/204 |
| 5,755,637 A * | 5/1998 | Park | ............................... | 475/275 |
| 5,856,709 A * | 1/1999 | Ibaraki et al. | .................... | 290/45 |
| 6,176,808 B1 * | 1/2001 | Brown et al. | ...................... | 477/5 |
| 6,478,705 B1 | 11/2002 | Holmes et al. | | |
| 7,220,200 B2 * | 5/2007 | Sowul et al. | ........................ | 475/5 |
| 7,238,132 B2 * | 7/2007 | Sowul et al. | ........................ | 475/5 |
| 7,261,660 B2 * | 8/2007 | Sowul et al. | ........................ | 475/5 |
| 7,347,797 B2 * | 3/2008 | Sowul et al. | ........................ | 475/5 |
| 7,497,796 B2 * | 3/2009 | Ordo et al. | ......................... | 475/5 |
| 7,524,257 B2 * | 4/2009 | Tabata et al. | ................... | 475/285 |
| 7,597,646 B2 * | 10/2009 | Kamm et al. | .................. | 475/277 |
| 7,597,648 B2 * | 10/2009 | Conlon et al. | ..................... | 477/4 |
| 7,618,340 B2 * | 11/2009 | Yang | ................................ | 475/150 |
| 7,645,206 B2 * | 1/2010 | Holmes et al. | ..................... | 475/5 |
| 2009/0275439 A1 * | 11/2009 | Kersting | ............................ | 475/5 |
| 2010/0004088 A1 * | 1/2010 | Wenthen | ........................ | 475/204 |
| 2010/0029428 A1 * | 2/2010 | Abe et al. | .......................... | 475/5 |
| 2010/0138086 A1 * | 6/2010 | Imamura et al. | ................. | 701/22 |
| 2010/0179009 A1 * | 7/2010 | Wittkopp et al. | .................. | 475/5 |
| 2010/0222171 A1 * | 9/2010 | Tabata et al. | ....................... | 475/5 |

\* cited by examiner

*Primary Examiner* — Troy Chambers
*Assistant Examiner* — Jude Agendia
(74) *Attorney, Agent, or Firm* — Quinn Law Group, PLLC (57) ABSTRACT

Various embodiments of electrically-variable transmissions are provided that have two motor-generators, two planetary gear sets, and two torque-transmitting mechanisms, including a rotating-type clutch and a stationary-type clutch. An input member is connected for common rotation with a ring gear of the first planetary gear set. Carriers of both of the planetary gear sets are connected for common rotation with one another, and with an output member. The first motor/generator is connected for common rotation with the sun gear of the first planetary gear set. The second motor/generator is connected for common rotation with the sun gear member of the second planetary gear set. A drive transfer assembly transfers torque from components establishing the first axis of rotation to components establishing the second axis of rotation.

13 Claims, 7 Drawing Sheets

MULTI-SPEED TRANSMISSION WITH AXIS TRANSFER

CROSS-REFERENCE TO RELATED APPLICATIONS

This application claims the benefit of U.S. Provisional Application Ser. No. 61/152,854, filed Feb. 16, 2009, which is hereby incorporated by reference in its entirety.

TECHNICAL FIELD

The disclosure relates to a multi-speed transmission with transfer of torque from components defining a first rotational axis to components defining a second rotational axis.

BACKGROUND OF THE INVENTION

Electrically-variable transmissions typically have an input member, an output member, and two electric motor/generators connected to different members of planetary gear sets. Clutches allow one or more electrically-variable modes of operation, fixed speed ratio modes, and an electric-only (battery-powered) mode. Electrically-variable transmissions may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate efficiency losses due to engine drag. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

It is challenging to package the two motor/generators, planetary gear sets, and multiple torque-transmitting mechanisms necessary to achieve the desired modes of operation, while meeting other applicable dimensional limitations and achieving relatively simple assembly requirements. Furthermore, although electrically variable transmissions are being mass-produced today, they are installed in only a very small fraction of the total number of vehicles produced today, and so engineering and tooling costs are likely to be a relatively larger portion of the total production costs as compared with those costs for other types of transmissions.

SUMMARY OF THE INVENTION

Various embodiments of electrically-variable transmissions are provided that have a first and a second motor-generator, a first and a second planetary gear set, and two torque-transmitting mechanisms, including a rotating-type clutch and a stationary-type clutch. An input member is connected for common rotation with a ring gear of the first planetary gear set. Carriers of both of the planetary gear sets are connected for common rotation with one another, and with an output member. The first motor/generator is connected for common rotation with the sun gear of the first planetary gear set. The second motor/generator is connected for common rotation with the sun gear member of the second planetary gear set.

A drive transfer assembly is provided that includes a drive member connected to the output member for rotation therewith, a driven member, and a gearing arrangement having first, second, and third members. The first member of the gearing arrangement is connected for rotation with the driven member. The drive transfer assembly includes a differential having a carrier connected for rotation with the second member of the gearing arrangement and first and second side gears. The third gear member of the gearing arrangement is connected to a stationary member such as a grounding member. An endless torque-transfer device, such as a chain, operatively connects the drive member to the driven member. The driven member, the gearing arrangement and the differential establish a second axis of rotation. Accordingly, the drive transfer assembly transfers torque from components establishing the first axis of rotation to components establishing the second axis of rotation.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
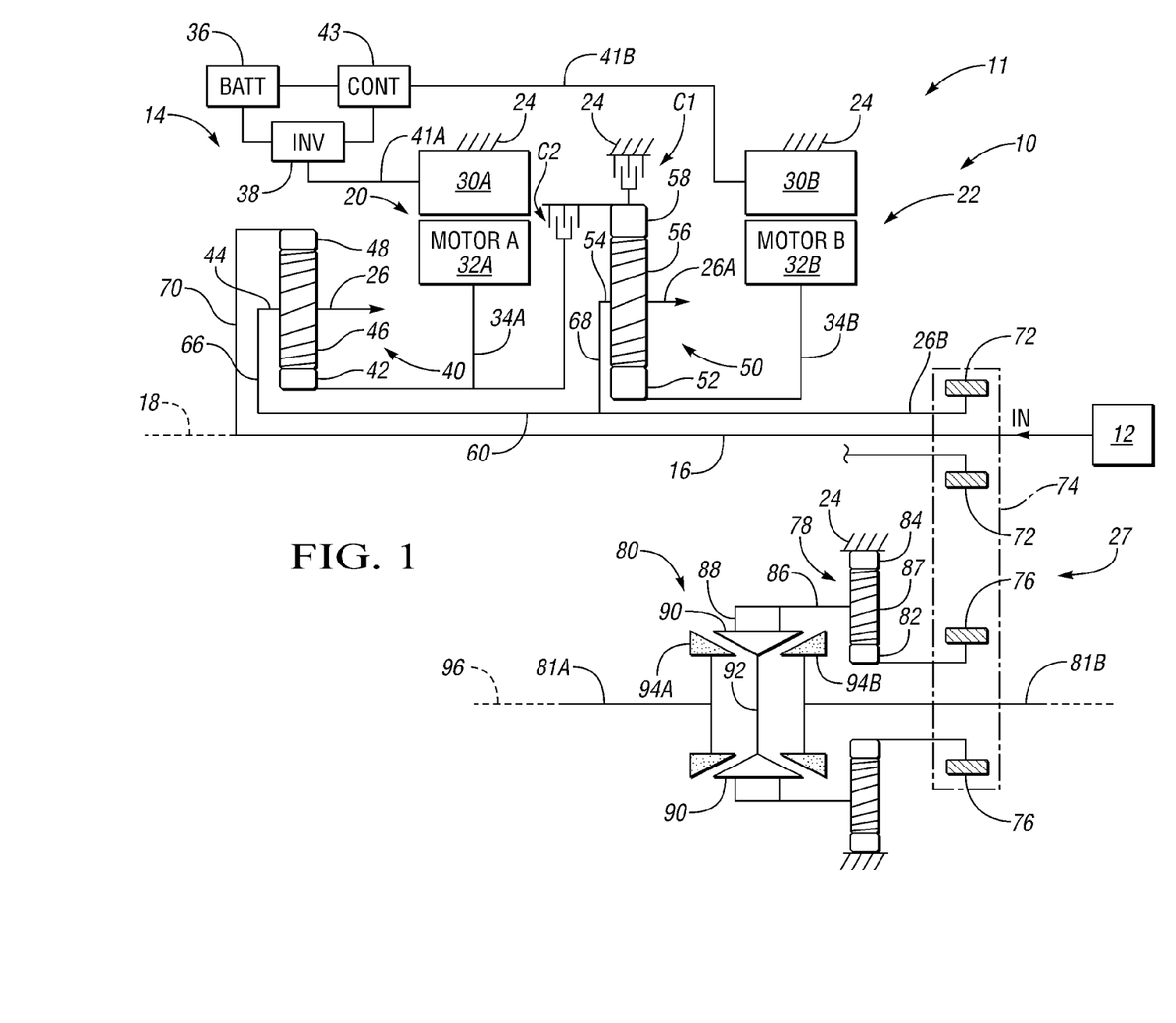
FIG. 1 is a schematic illustration of a first embodiment of a hybrid electric powertrain including a first embodiment of an electrically variable transmission with a first embodiment of an output transfer assembly.

Referring to the drawings wherein like reference numbers refer to like components, FIG. 1 shows a powertrain 10 for a vehicle 11. The powertrain 10 includes an engine 12 drivingly connected with an electrically variable transmission 14. An output member of the engine 12 is connected for driving an input member 16 of the transmission 14. The input member 16 rotates about and establishes an axis of rotation 18.

A first motor/generator 20 and a second motor/generator 22 are packaged within a transmission casing 24 and are operatively connected between the input member 16 and three alternative transmission output members 26, 26A, 26B. The transmission casing 24 is shown only in part, and is generally annular, surrounding the entire transmission 14, with end walls closing off the axial ends and having access openings for the input member 16 and the output member 26, 26A or 26B to extend therethrough. As discussed below, alternate locations serving as alternate transmission output members 26, 26A, 26B are also provided. All of the potential output members 26, 26A, 26B are interconnected to rotate commonly (i.e., at the same speed). Any one, but only one, of the transmission output members 26, 26A and 26B may be connected with a drive transfer assembly to a final drive. The selection of which output location will serve as the output member connected with the drive transfer assembly will depend on packaging requirements of the powertrain 10 within the vehicle. As discussed below, in FIG. 1, output member 26B is connected with a drive transfer assembly 27. The various drive transfer assemblies shown and described herein are not necessarily to scale; however, positioning of the drive transfer assembly within the transmission ensures appropriate component clearances.

The first motor/generator 20 includes an annular stator 30A grounded to the transmission casing 24, an annular rotor 32A supported on and for rotation with a rotatable rotor hub 34A and concentric about the first axis of rotation 18. A battery 36, power inverter 38 and electronic controller 43 are operatively connected with the stator 30A via transfer conductor 41A to control the functioning of the motor/generator 20 as a motor, in which stored electrical power is provided by the battery 36 to the stator 30A, and a generator, in which torque of the rotating rotor 32A is converted to electrical power stored in the battery 36. The ability to control a motor/generator to function as a motor or as a generator is well known.

Similarly, the second motor/generator 22 includes an annular stator 30B grounded to the transmission casing 24, an annular rotor 32B supported on a rotatable rotor hub 34B and concentric about the axis of rotation 18. The battery 36, power inverter 38 and electronic controller 43 are operatively connected with the stator 30B via transfer conductor 41B to control the functioning of the motor/generator 22 as a motor and a generator.

The transmission 14 further includes first and second planetary gear sets 40, 50. Planetary gear set 40 has a first member that is a sun gear 42, a second member that is a carrier 44 that rotatably supports a plurality of pinion gears 46 meshing with the sun gear 42, and a third member that is a ring gear 48 meshing with the pinion gears 46. Rotor hub 34A is connected for common rotation with the sun gear 42. Alternative output member 26 is connected to carrier 44 for rotation therewith.

Planetary gear set 50 has a first member which is a sun gear 52, a second member that is a carrier 54 that rotatably supports a plurality of pinion gears 56 meshing with the sun gear 52, and a third member that is a ring gear 58 meshing with the pinion gears 56. Alternate output member 26A is connected with the carrier 54 for rotation therewith. Rotor hub 34B is connected for rotation with the sun gear 52.

The transmission 14 includes two torque-transmitting mechanisms. A stationary-type clutch C1, also referred to as a brake, is selectively engagable to ground the ring gear 58 to the transmission casing 24. Rotating-type clutch C2 is selectively engagable to connect the sun gear 42 for common rotation with ring gear 58. Those skilled in the art will recognize that only a portion of the transmission 14 above the input member 16 is shown schematically; and portions of the planetary gear sets 40, 50, clutches C1, C2 and other components generally symmetrical about the input member 16 are not shown.

Annular sleeve shaft 60 forming output member 26B concentric with the input member 16, and hub members 66 and 68 connect the carriers 44, 54 for common rotation with the shaft 60, and with all of the alternate output members 26, 26A, 26B. Hub member 70 extends from input member 16 to connect the ring gear 48 for common rotation therewith.

Transmission 14 is configured so that planetary gear set 40 is positioned axially between a radially-extending end wall (not shown) of the casing 24 and the motor/generator 20. The end wall is to the left of the planetary gear set 40 as the transmission 14 is illustrated in FIG. 1. Planetary gear set 50 is positioned axially between the motor/generators 20, 22. Clutch C1 is positioned radially outward and aligned with the ring gear 58 of planetary gear set 50. Clutch C2 is positioned axially between motor/generator 20 and planetary gear set 50 and is aligned with ring gear 58.

A first forward mode of operation is established by engaging clutch C1 and releasing clutch C2. This mode of operation is an input-split operating mode, with planetary gear set 40 operating in a differential mode and planetary gear set 50 operating in a torque multiplication mode, engine 12 providing torque and motor/generator 20 motoring in a forward direction. A reverse electrically variable operating mode is established with the same clutch engagement, but with the motor/generator 20 motoring in a reverse direction.

A second forward mode of operation is established by engaging clutch C2 and disengaging clutch C1. The shift between modes occurs when the speed of rotor 32A is zero, and the speed of ring gear 58 is also zero (due to engagement of clutch C1), so that the shift can occur without torque disturbance. A fixed forward speed ratio is established by engaging both C1 and C2.

The drive transfer assembly 27 is shown driven by the output member 26B to transfer torque from the transmission 14 to vehicle wheels. Specifically, a drive member 72 in the form of a sprocket is mounted to the output member 26B for rotation therewith. An endless chain 74 connects the drive member 72 with a driven member 76, also in the form of a sprocket, to transfer drive torque from the drive member 72 to the driven member 76. The driven member 76 is operatively connected with a gearing arrangement 78, a differential 80 and, ultimately to wheel axles 81A, 81B to deliver torque to vehicle wheels.

The gearing arrangement 78 is a planetary gear set with a sun gear 82 connected for rotation with driven member 76, a ring gear 84 grounded to the transmission housing 24, and a carrier 86 that rotatably supports pinion gears 87 that mesh with both the sun gear 82 and the ring gear 84.

The differential 80 includes a carrier 88 that rotatably supports pinion gears 90 rotating on a pinion shaft 92. The pinion gears 90 mesh with side gears 94A and 94B. Side gear 94A is connected for common rotation with wheel axle 81A, and side gear 94B is connected for common rotation with wheel axle 81B. The driven gear 76, gearing arrangement 78, side gears 94A, 94B and wheel axles 81A, 81B rotate about and establish a second axis of rotation 96. Thus, the transmission 14 is configured to transfer torque from a first axis 18, partially defined by the input member 16 and the output member 26B, to a second axis 96, partially defined by wheel axles 81A, 81B, via a sprocket and chain arrangement (drive element 72, driven element 76 and chain 74). In the embodiment of FIG. 1, the gearing arrangement 78 is positioned axially between the driven element 76 and the differential 80.

Second Drive Transfer Assembly Embodiment

Figure 2:
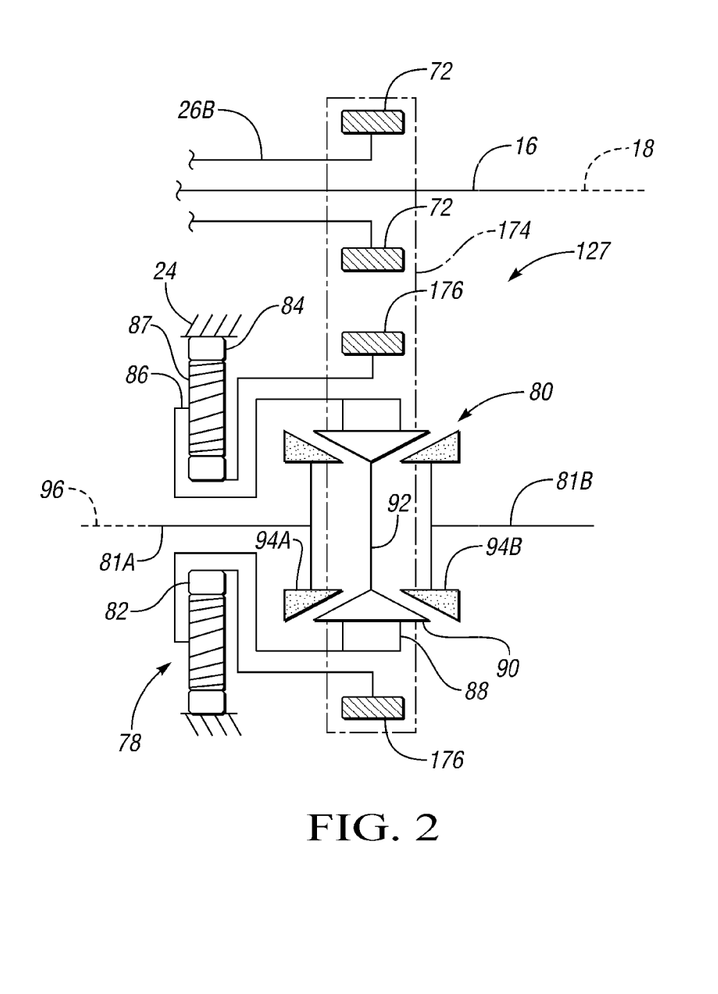
FIG. 2 is a schematic illustration of a second embodiment of an output transfer assembly.

FIG. 2 shows another embodiment of a drive transfer assembly 127 connected to the output member 26B of transmission 14 for transferring torque to wheel axles 81A, 81B. Components that are the same as those of drive transfer assembly 27 are shown and described with the same reference numbers. Driven member 176 radially surrounds the differential 80. Chain 174 transfers torque from drive member 72 to driven member 176 and radially surrounds the differential 80. Both drive member 72 and driven member 176 are sprockets. Because the driven member 176 is radially aligned with the differential 80, both are on the same side of the gearing arrangement 78 (i.e., input and output to the gearing arrangement 78 are on the same side of the gearing arrangement 78).

Third Drive Transfer Assembly Embodiment

Figure 3:
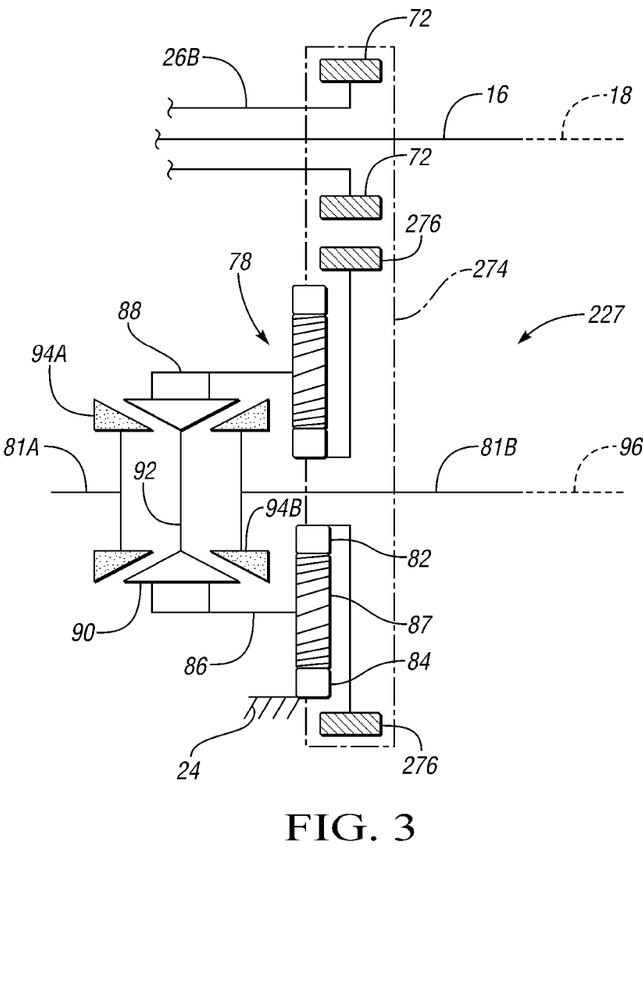
FIG. 3 is a schematic illustration of a third embodiment of an output transfer assembly.

FIG. 3 shows another embodiment of a drive transfer assembly 227 connected to the output member 26B of transmission 14 for transferring torque to wheel axles 81A, 81B. Components that are the same as those of drive transfer assembly 27 are shown and described with the same reference numbers. Driven member 276 is radially outward of and partially radially surrounds the gearing arrangement 78. Chain 274 transfers torque from drive member 72 to driven member 276 and partially radially surrounds the gearing arrangement 78. Both drive member 72 and driven member 276 are sprockets.

Fourth Drive Transfer Assembly Embodiment

Figure 4:
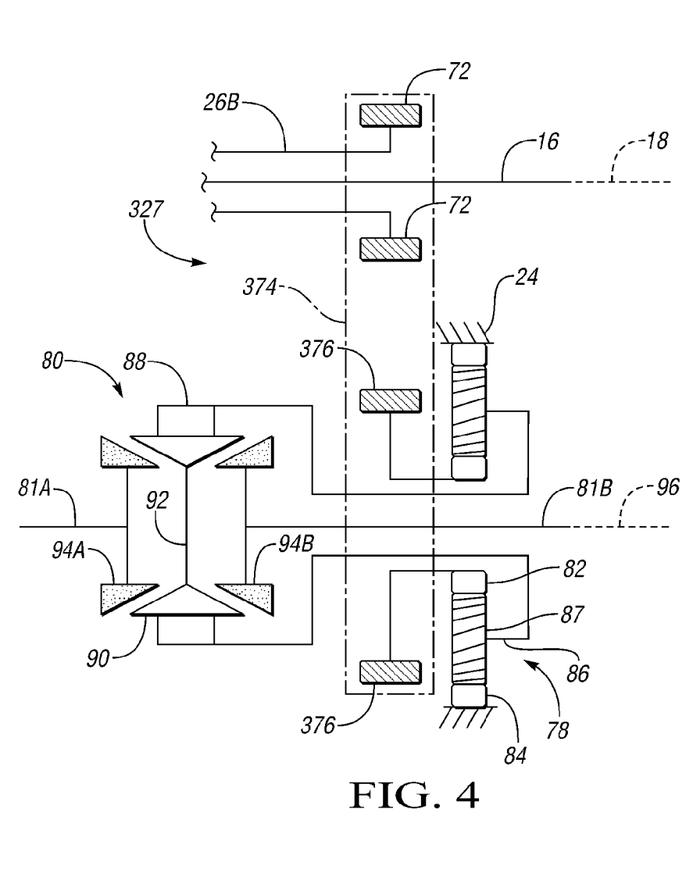
FIG. 4 is a schematic illustration of a fourth embodiment of an output transfer assembly.

FIG. 4 shows another embodiment of a drive transfer assembly 327 connected to the output member 26B of transmission 14 for transferring torque to wheel axles 81A, 81B. Components that are the same as those of drive transfer assembly 27 are shown and described with the same reference numbers. Chain 374 transfers torque from drive member 72 to driven member 376. Both drive member 72 and driven member 376 are sprockets. The driven member 376 is positioned axially between the gearing arrangement 78 and the differential 80.

Fifth Drive Transfer Assembly Embodiment

Figure 5:
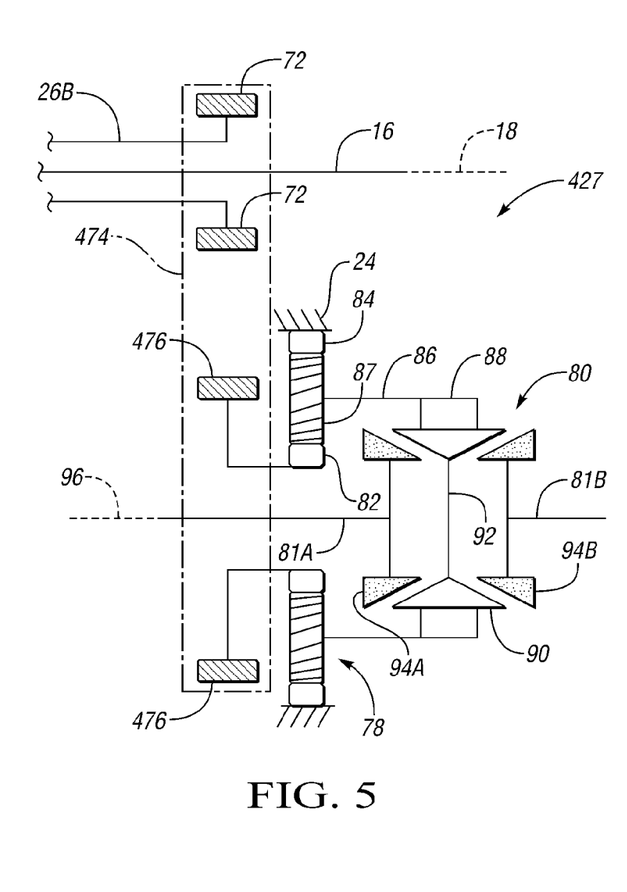
FIG. 5 is a schematic illustration of a fifth embodiment of an output transfer assembly.

FIG. 5 shows another embodiment of a drive transfer assembly 427 connected to the output member 26B of transmission 14 for transferring torque to wheel axles 81A, 81B. Components that are the same as those of drive transfer assembly 27 are shown and described with the same reference numbers. Chain 474 transfers torque from drive member 72 to driven member 476. Both drive member 72 and driven member 476 are sprockets. The gearing arrangement 78 is positioned axially between the driven member 476 and the differential 80.

Second Transmission Embodiment with Fifth Drive Transfer Assembly Embodiment

Figure 6:
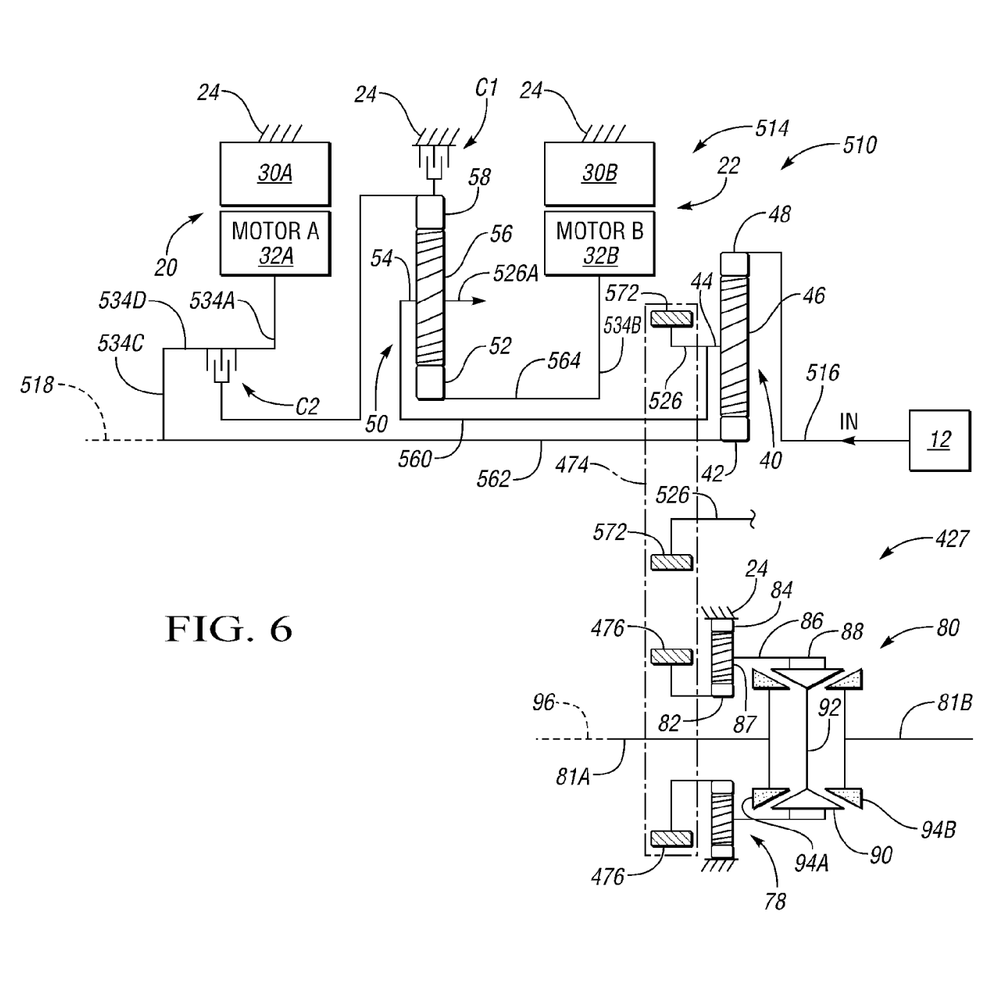
FIG. 6 is a schematic illustration of a second embodiment of a hybrid electric powertrain including a second embodiment of an electrically variable transmission with the fifth embodiment of an output transfer assembly.

Referring to FIG. 6, powertrain 510 includes an engine 12 and an electrically variable transmission 514 having many of the same components, referred to with the same reference numbers, that function in the same way as shown and described with respect to the transmission 14 and powertrain 10 of FIG. 1. Although not shown in FIG. 6, a battery 36, inverter 38, and controller 43 are connected with the stators 30A, 30B as shown and described in FIG. 1.

Transmission 514 is configured so that motor/generator 20 is positioned axially between a radially-extending end wall (not shown) of the casing 24 and the planetary gear set 50. Clutch C1 is positioned radially outward and aligned with the ring gear 58 of planetary gear set 50. Clutch C2 is positioned radially inward of motor/generator 20, and axially between the end wall and motor/generator 20. Planetary gear set 50 is positioned axially between motor/generator 20 and the motor/generator 22. Motor/generator 22 is positioned axially between the planetary gear set 50 and planetary gear set 40. Planetary gear set 40 is positioned between motor/generator 22 and an opposing radially-extending end wall (not shown) of the casing 24.

Transmission 514 has an input member 516 axially spaced from and coaxial but not concentric with shaft 560. Shaft 560 which connects to alternative output members 526, 526A. Shaft 562 is coaxial with input member 516. Output members 526, 526A share a common axis of rotation 518 with input member 516. Input member 516 is connected for common rotation with ring gear 48. Shaft 562 connects rotor hub 534A for common rotation with sun gear 42. The clutch C2 is nested between axially-extending portion 534D, hub 534C and the shaft 562. Sleeve shaft 560 is concentric with shaft 562 and connects carrier member 54 to carrier member 44 and an output member 526 connected thereto. Sleeve shaft 564 connects rotor hub 534B with sun gear 52. Alternate output member 526A extends from the carrier member 54.

Drive transfer assembly 427 of FIG. 5 is connected to a drive member 572 mounted to the output member 526 of transmission 514 for transferring torque to wheel axles 81A, 81B. Components that are the same as those of drive transfer assembly 27 are shown and described with the same reference numbers. Chain 474 transfers torque from drive member 572 to driven member 476. Both drive member 572 and driven member 476 are sprockets. Drive member 572 is positioned axially between motor/generator 22 and planetary gear set 40. The gearing arrangement 78 is positioned axially between the driven member 476 and the differential 80.

Second Transmission Embodiment with Sixth Drive Transfer Assembly Embodiment

Figure 7:
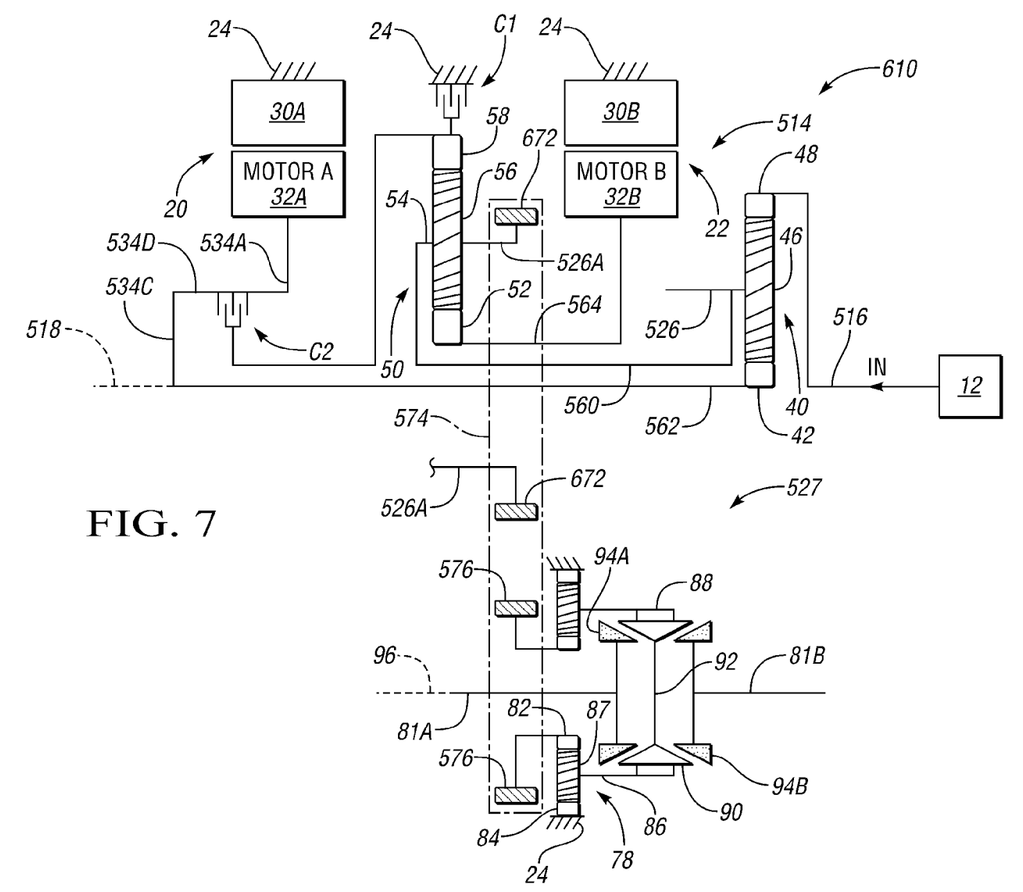
FIG. 7 is a schematic illustration of a third embodiment of a hybrid electric powertrain including the second embodiment of an electrically variable transmission with a sixth embodiment of an output transfer assembly.
Figure 8:
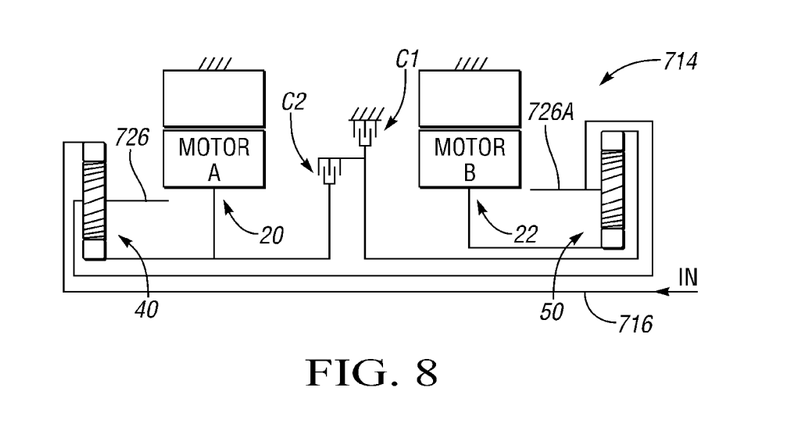
FIGS. 8-12 are schematic illustrations of additional transmission embodiments.
Figure 9:
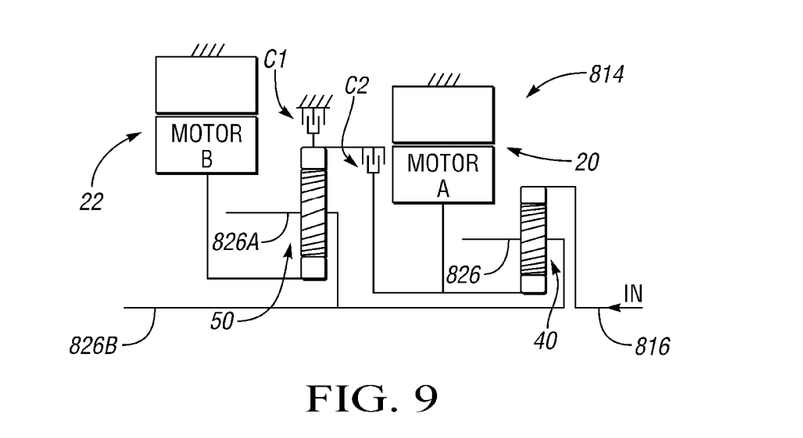
Figure 10:
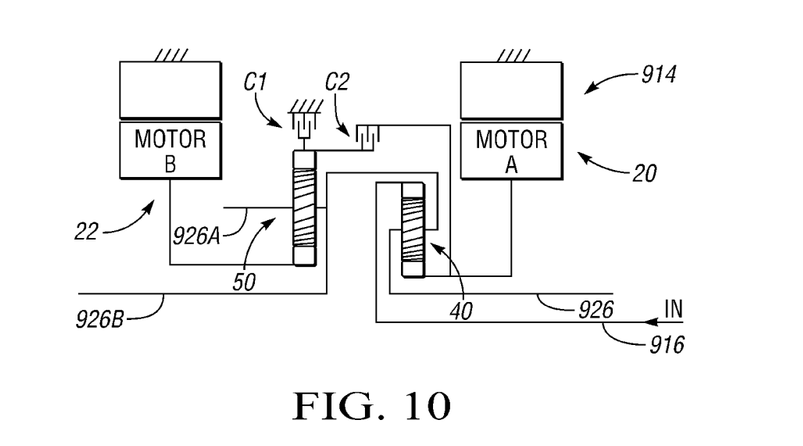
Figure 11:
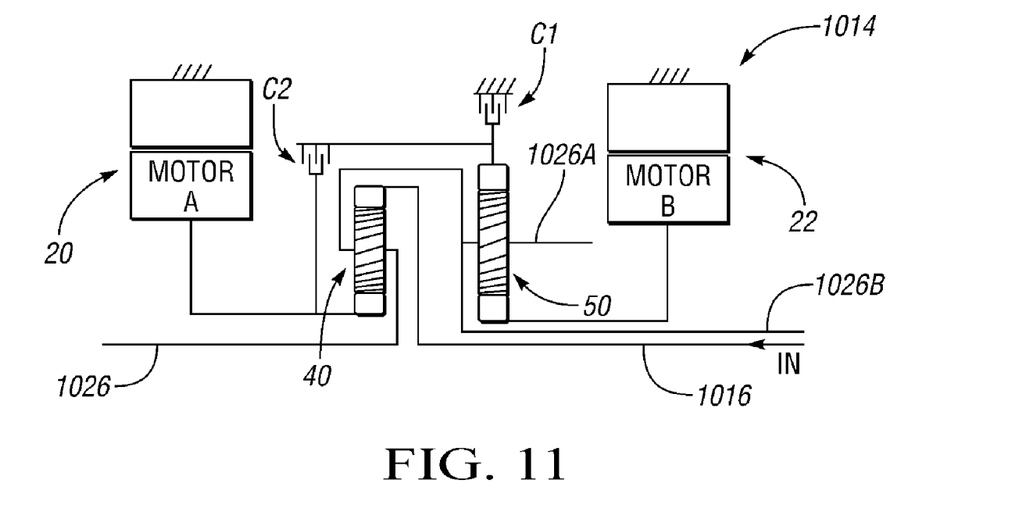
Figure 12:
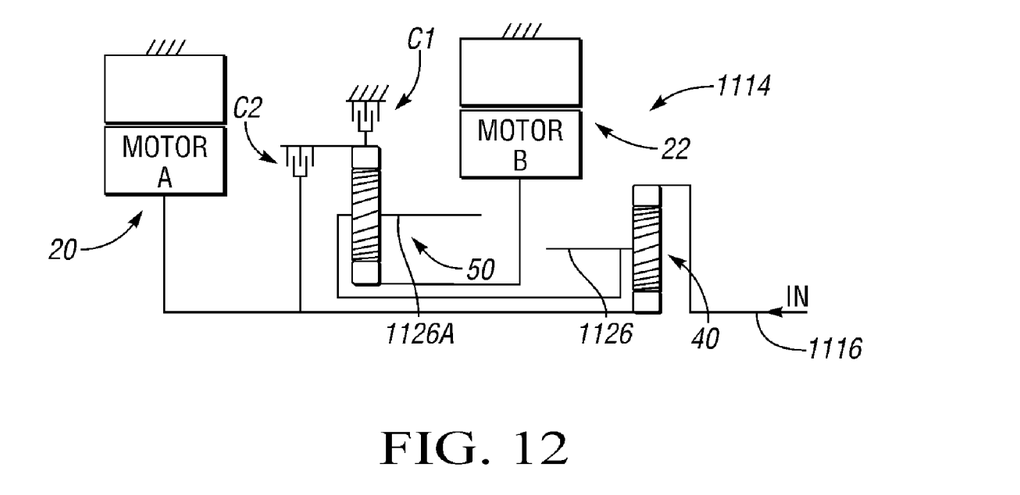

Referring to FIG. 7, powertrain 610 includes engine 12 and electrically variable transmission 514 of FIG. 6, with a drive transfer assembly 527 driven by a drive member 672 connected to output member 526A of transmission 514. Drive member 672 is positioned axially between planetary gear set 50 and motor/generator 22, and axially between motor/generators 20, 22. Drive transfer assembly 527 transfers torque to wheel axles 81A, 81B. Components that are the same as those of drive transfer assembly 27 are shown and described with the same reference numbers. Chain 574 transfers torque from drive member 672 to driven member 576. Both drive member 672 and driven member 576 are sprockets. The gearing arrangement 78 is positioned axially between the driven member 576 and the differential 80.

Additional Transmission Embodiments

FIGS. 8-12 show additional embodiments of transmissions 714, 814, 914, 1014, and 1114, respectively, each having motor/generators 20, 22, planetary gear sets 40, 50, and clutches C1, C2 as described herein. Each has a respective input member 716, 816, 916, 1016, and 1116 for connection with engine 12 of FIG. 1 (engine not shown in FIGS. 8-12). As with the transmissions of FIGS. 1, 6, and 7, the sun gear of each of planetary gear sets 40, 50 is connected for common rotation with the respective rotor of motor/generator 20, 22, and multiple possible output member locations are connected for common rotation with carrier members of the planetary gear sets 40, 50. For example, transmission 714 has output members 726 and 726A. Any of the drive transfer assemblies described herein may be driven from either output 726 or 726A. Transmission 814 has output members 826, 826A, and 826B. Any of the drive transfer assemblies described herein may be driven from either output 826 or 826B, and drive transfer assembly 527 could be driven from output 826A. Transmission 914 has output members 926, 926A, and 926B. Any of the drive transfer assemblies described herein may be driven from either output 926 or 926B, and drive transfer assembly 527 could be driven from output 926A. Transmission 1014 has output members 1026, 1026A, and 1026B. Any of the drive transfer assemblies described herein may be driven from either output 1026 or 1026B, and drive transfer assembly 527 could be driven from output 1026A. Transmission 1114 has output members 1126 and 1126A. Any of the drive transfer assemblies described herein may be driven from output 1126. Drive transfer assembly 527 could be driven from output 1126A.

While the best modes for carrying out the invention have been described in detail, those familiar with the art to which this invention relates will recognize various alternative designs and embodiments for practicing the invention within the scope of the appended claims.

The invention claimed is:

1. An electrically-variable transmission for a vehicle, comprising:
   an input member, an output member, and a stationary member; wherein the input member and the output member establish a first axis of rotation;
   a first and a second planetary gear set, each having a sun gear, a carrier rotatably supporting pinion gears, and a ring gear, with the pinion gears meshing with both the sun gear and the ring gear;
   a first and a second motor/generator; wherein the first motor/generator is connected for rotation with the sun gear of the first planetary gear set and the second motor/generator is connected for rotation with the sun gear of the second planetary gear set;
   a first torque-transmitting mechanism selectively engagable to ground the ring gear of the second planetary gear set to the stationary member;
   a second torque-transmitting mechanism selectively engagable to connect the sun gear of the first planetary gear set with the ring gear of the second planetary gear set;
   a drive member connected to the output member for rotation therewith;
   a driven member;
   a gearing arrangement having first, second, and third members; wherein the first member is connected for rotation with the driven member and the third member is grounded to the stationary member;
   a differential having a carrier connected with the second member of the gearing arrangement for rotation at the same speed as the second member of the gearing arrangement and having first and second side gears; and
   an endless toque-transfer device operatively connecting the drive member to the driven member; wherein the driven member, the gearing arrangement and the differential establish a second axis of rotation.

2. The electrically-variable transmission of claim 1, wherein the drive member and the driven member are sprockets.

3. The electrically-variable transmission of claim 1, wherein the gearing arrangement is a planetary gear set having a sun gear, a carrier rotatably supporting pinion gears, and a ring gear, with the pinion gears of the gearing arrangement meshing with both the sun gear of the gearing arrangement and the ring gear of the gearing arrangement.

4. The electrically-variable transmission of claim 3, wherein the driven member is connected for rotation with the sun gear of the gearing arrangement, the carrier of the differential is connected with the carrier of the gearing arrangement for common rotation at the same speed as the carrier of the gearing arrangement, and the ring gear of the gearing arrangement is grounded to the stationary member.

5. The electrically-variable transmission of claim 1, wherein the gearing arrangement is positioned axially between the driven member and the differential.

6. The electrically-variable transmission of claim 5, wherein the drive member is located axially between the first and the second motor/generator.

7. The electrically-variable transmission of claim 1, wherein the driven member is positioned axially between the gearing arrangement and the differential.

8. The electrically-variable transmission of claim 1, wherein the driven member radially surrounds the differential.

9. The electrically-variable transmission of claim 1, wherein the drive member is positioned axially between one of the motor/generators and one of the planetary gear sets.

10. The electrically-variable transmission of claim 1, wherein the endless torque-transfer device at least partially surrounds the gearing arrangement.

11. An electrically-variable transmission for a vehicle, comprising:
    an input member, an output member, and a stationary member; wherein the input member and the output member establish a first axis of rotation;
    a first and a second planetary gear set, each having a sun gear, a carrier rotatably supporting pinion gears, and a ring gear, with the pinion gears meshing with both the sun gear and the ring gear;
    a first and a second motor/generator; wherein the first motor/generator is connected for rotation with the sun gear of the first planetary gear set and the second motor/generator is connected for rotation with the sun gear of the second planetary gear set;
    only two torque-transmitting mechanisms including:
       a first torque-transmitting mechanism selectively engagable to ground the ring gear of the second planetary gear set to the stationary member; and
       a second torque-transmitting mechanism selectively engagable to connect the sun gear of the first planetary gear set with the ring gear of the second planetary gear set;
    a drive member connected to the output member for rotation therewith; wherein the drive member is axially adjacent one of the motor/generators and on an opposite side of said one of the motor/generators than the other motor/generator and the planetary gear sets;
    a driven member;
    a gearing arrangement having first, second, and third members; wherein the first member is connected for rotation with the driven member and the third member is grounded to the stationary member;
    a differential having a carrier connected with the second member of the gearing arrangement for rotation with the second member of the gearing arrangement and having first and second side gears; and
    an endless toque-transfer device operatively connecting the drive member to the driven member; wherein the driven member, the gearing arrangement and the differential establish a second axis of rotation.

12. The electrically-variable transmission of claim 11, wherein the gearing arrangement is positioned axially between the driven member and the differential.

13. The electrically-variable transmission of claim 11, wherein the driven member radially surrounds the differential.

* * * * *